United States Patent [19]  
Takeyasu et al.

[11] Patent Number: 4,884,856  
[45] Date of Patent: Dec. 5, 1989

[54] POLYGONAL MIRROR AND METHOD OF MAKING SAME

[75] Inventors: Hatsuichi Takeyasu, Kawaguchi; Kenichi Sakata, Utsunomiya; Fumitoshi Yura, Tochigi, all of Japan

[73] Assignee: Asahi Kogaku Kogyo K.K., Tokyo, Japan

[21] Appl. No.: 177,351

[22] Filed: Apr. 1, 1988

[30] Foreign Application Priority Data

Apr. 3, 1987 [JP] Japan .................................. 62-82607

[51] Int. Cl.$^4$ ............................................. G02B 26/10
[52] U.S. Cl. ..................................... 350/6.8; 350/609; 350/320
[58] Field of Search .................. 350/6.5, 6.6, 6.7, 6.8, 350/609, 616, 320

[56] References Cited

U.S. PATENT DOCUMENTS 3,531,785 9/1970 Corcoran ............................ 350/6.7
4,277,141 7/1981 Kleiber ............................... 350/616

FOREIGN PATENT DOCUMENTS 57-29004 2/1982 Japan .................................... 350/6.7
61-175615 8/1986 Japan .................................... 350/6.8
61-228409 10/1986 Japan .................................... 350/6.8

Primary Examiner—Bruce Y. Arnold  
Assistant Examiner—Loha Ben  
Attorney, Agent, or Firm—Sandler & Greenblum

[57] ABSTRACT

A polygonal mirror comprising a mirror body in the form of a regular prism. A plurality of side faces of the regular prism are formed respectively into reflecting faces. During rotation of the mirror body about its central axis, the reflecting faces successively deflect an indicent light ray to cause the deflected light ray to carry out scanning. A flange is integrally provided on the mirror body, and has a size at least equal to a circle circumscribing the regular prism in a plane perpendicular to the central axis.

17 Claims, 2 Drawing Sheets

POLYGONAL MIRROR AND METHOD OF MAKING SAME

Background of the Invention

This invention relates to a polygonal mirror for deflecting an incident light ray to cause the deflected light ray to carry out scanning in laser beam printers and the like.

Recently, a laser beam printer has been employed, which utilizes a so-called electrophotographic system wherein a laser beam is used to scan a photosensitive surface of a drum along an axis thereof to carry out a main scanning, and the drum is rotated to carry out an auxiliary scanning, to thereby form a latent image on the drum surface. Toner is then applied to the latent image to develop the same. Subsequently, the developed toner image is transferred to a recording paper sheet, and the transferred toner image is fixed by a fixing unit. In addition, a laser photo-plotter is also known, wherein a laser beam is used to scan a photosensitive material surface to form an original plate of a printed circuit board or the like. In such laser beam printer and laser photo-plotter, a rotary multi-face mirror or a so-called polygonal mirror is employed to cause the laser beam from a fixedly mounted laser diode or laser oscillator to effect the scanning linearly. The polygonal mirror comprises a regular prism having a plurality of side faces which are formed respectively into deflecting mirror faces.

The polygonal mirror is formed of a raw material such as optical glass or aluminum alloy. The raw material is processed and formed into a predetermined regular prism which has a plurality of side faces or mirror forming faces. The side faces are ground to a predetermined accuracy including surface roughness and flatness. Subsequently, silver plating or aluminum plating is applied to the side faces to bring the same respectively to mirror faces.

In recent years, aluminum alloy has increasingly been employed as the raw material of the polygonal mirror. However, although the aluminum alloy is easy in processing, it is extremely difficult to process the individual faces of the regular prism to bring the accuracy thereof to a requisite level. Thus, a long time is required for the processing, thereby increasing the manufacturing cost.

An attempt has been made to use a plastic material as the raw material of the polygonal mirror, and to use a mold to integrally form the regular prism by means of injection molding.

However, when the regular prism is integrally formed by means of injection molding as described above, such problems might occur that, because of the regular polygon shape, sink marks and/or weld lines are developed on the side faces of the regular prism due to non-uniformity or unevenness of the wall thickness. If such sink marks and/or weld lines are developed, it is no longer possible for the side faces of the regular prism to secure the requisite accuracy.

Further, there also exists such a problem that molding shrinkage percentage varies depending upon a delicate difference in molding conditions such as pressure, temperature, time and operating speed, so that the molding shrinkage percentage sometimes exceeds an allowable accuracy range.

Moreover, although not limited to the plastic molded articles, there also exists such a problem that, since the entire outer periphery of the regular prism is formed into the mirror faces, sufficient care or attention is required to be paid to handling of the regular prism during plating and after completion of plating. This involves many man-hour, resulting in an increase in the manufacturing cost.

SUMMARY OF THE INVENTION

It is therefore an object of this invention to provide an improved polygonal mirror which is capable of preventing occurrence of molding defects such as sink marks, weld lines and the like, which is capable of securing sufficient accuracy regardless of a slight change in molding conditions, which is easy in handling, and which is low in manufacturing cost.

For the above purpose, according to the invention, there is provided a polygonal mirror comprising:

a mirror body in the form of a regular prism having a central axis, the regular prism having a plurality of side faces formed respectively into reflecting faces, wherein during rotation of the mirror body about the central axis, the reflecting faces successively deflect an incident light ray to cause the deflected light ray to carry out scanning; and a flange unitarily formed and integrally provided on the mirror body, the flange having a size at least equal to a circle circumscribing the regular prism in a plane perpendicular to the central axis.

BRIEF DESCRIPTION OF THE ACCOMPANYING DRAWINGS

DETAILED DESCRIPTION

Figure 1:
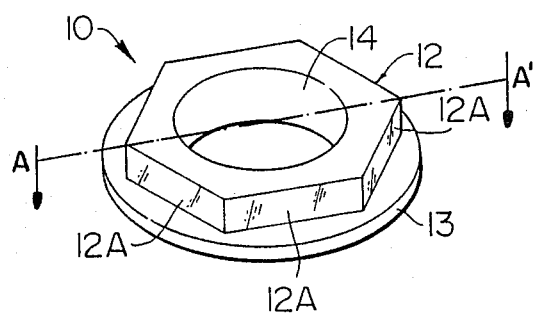
FIG. 1 is a perspective view of a polygonal mirror embodying the invention.
Figure 2:
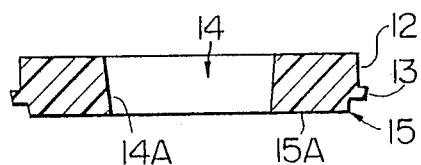
FIG. 2 is a cross-sectional view of the polygonal mirror illustrated in FIg. 1 along line AA'.

Referring to FIGS. 1 and 2, there is illustrated a polygonal mirror 10 embodying the invention, for use in a laser beam printer. The polygonal mirror 10 is integrally molded in polycarbonate (PC) by the use of a mold so as to have six reflecting faces. The polygonal mirror 10 is generally composed of a mirror body 12 and a flange 13.

The mirror body 12 is in the form of a thin or low hexagonal prism having a regular hexagon as viewed in plan. The mirror body 12 has six side faces which are brought to a predetermined surface accuracy and are formed respectively into reflecting faces 12A. A distance between each pair of opposed parallel reflecting faces 12A is 26 mm, and an axial length or thickness of the mirror body 12 is 3 mm.

The flange 13 is in the form of a disc having a diameter larger than that of a circle circumscribing the hexagonal mirror body 12 in a plane perpendicular to a central axis thereof. The flange 13 is 31 mm in diameter, and 1 mm in thickness. The flange 13 is integrally and unitarily formed on the mirror body 12 in the vicinity of axial one end thereof.

A circular projection 15 projects axially in an integral manner from an end face of the flange 13 remote from the other axial end of the mirror body 12. The projection 15 has a diameter 28 mm which is smaller than that of the flange 13, and an axial length of 1 mm. The projection 15 has its free end face 15A which is brought to a predetermined accuracy including flatness, an axial distance to the reflecting faces 12A and a right-angled degree with respect to the reflecting faces 12A. Thus, the end face 15A serves as a reference surface when the polygonal mirror 10 is installed.

The mirror body 12 is provided therein with a central attaching bore 14 for attaching the polygonal mirror 10 to the laser beam printer. The attaching bore 14 extends through the mirror body 12 in concentric relation to the central axis thereof, and is 15 mm in diameter.

The attaching bore 14 is so formed that a center of the attaching bore 14, i.e., a rotational center of the polygonal mirror 10 is located at an equal distance from each of the reflecting faces 12A of the mirror body 12 within a predetermined accuracy In other words, the attaching bore 14 is so formed as to have no eccentricity with respect to the reflecting faces 12A within the predetermined accuracy. Also, the attaching bore 14 is so formed that the diameter is brought to a predetermined accuracy.

The polygonal mirror 10 having the above-mentioned configuration is injection-molded in the following manner. That is, molten polycarbonate is injected from a runner or a sprue located in alignment with the center of the attaching bore 14, into a mold cavity through a plurality of radial gates, a disc gate or the like. This makes it possible to equalize a radial distance from the gates or gate to the outer periphery of the flange 13, that is, to the radial extremity of the polygonal mirror 10 in every locations. In addition, the polygonal mirror 10 can be formed such that the required amount of the molten polycarbonate to be distributed in a radial direction within the molding cavity approaches an almost uniform level, as compared with a case where the mirror body is molded independently. Thus, sink marks can be prevented from occurring on the reflecting faces 12A and on other sections, and moldability can be improved considerably.

A mold structure for molding the above polygonal mirror 10 may be a conventional one which is generally used. For example, a split mold structure shown in FIG. 3 can be employed, in which a first parting line P.L. is formed at an end face of the flange 13 on the side of the mirror body 12, and a second parting line P.L. is formed at an end face of the mirror body 12 remote from the flange 13. In addition, the flange 13 and the projection 15 are located on a stationary side or a core side, while the mirror body 12 and the attaching bore 14 are located on a movable side or a cavity side. When the polygonal mirror 10 is molded by the use of the split mold structure shown in FIG. 3, the reflecting faces 12A can be formed in parallel relation to the central axis of the mirror body 12, without the reflecting faces 12A being inclined with respect to the central axis of the mirror body 12.

Figure 4:
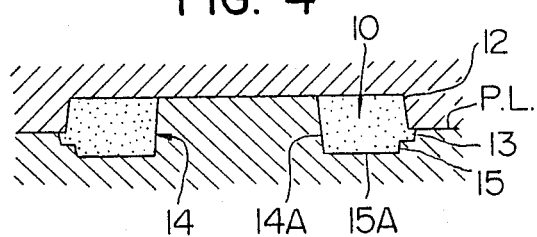
FIG. 4 is a view similar to FIG. 3, but showing another mold structure.

Another mold structure shown in FIG. 4 can also be employed, in which a single parting line P.L. is formed at the end face of the flange 13 on the side of the mirror body 12. In addition, the flange 13 and the projection 15 as well as the attaching bore 14 are located on the core side, while the mirror body 12 is located on the cavity side. In this case, a uniform draft of about 2 degrees is applied to each of the reflecting faces 12A. In this connection, an error in angle of the draft is required to be within a predetermined accuracy.

If the mold structure shown in FIG. 4 is employed, it is unnecessary to use a split mold and a slide core, so that it is made easy to manufacture the mold and to increase the accuracy of the mold beyond comparison. In addition, it is possible to considerably reduce variation in accuracy of molded articles due to wear of sliding surfaces of the mold, thereby stabilizing the quality of the polygonal mirror 10. The polygonal mirror 10 molded by the use of the mold structure shown in FIG. 4 has the reflecting faces 12A which are inclined with respect to the central axis of the mirror body 12. Accordingly, in use of the polygonal mirror 10 illustrated in FIG. 4, scanning of a light ray deflected by the reflecting faces 12A is carried out in a nonlinear fashion. However, such nonlinearity can be corrected by a correcting optical system interposed between the reflecting faces 12A and a surface to be scanned.

Figure 3:
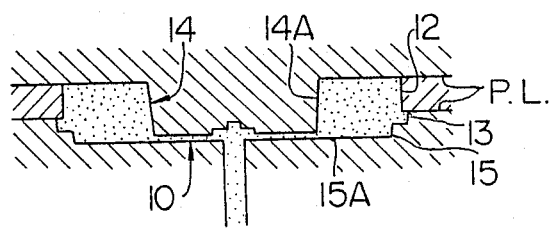
FIG. 3 is a cross-sectional view of a mold structure for use in molding of the polygonal mirror illustrated in FIG. 1 along line AA'.

As a matter of course, in the mold structures shown in FIGS. 3 and 4, the attaching bore 14 may be formed so as to be located on either side of the core and the cavity. Although a draft is inevitably applied to an inner peripheral wall surface 14A of the attaching bore 14, the draft should be set to a direction which is convenient for the molding conditions including removal of a molded article from the mold and for installation of the polygonal mirror 10. It is needless to say that a draft of each of portions, which do not require the surface accuracy of the order of the reflecting faces 12A, is not in particular limited, if the draft is greater than the minimum limit required for removal of a molded article from the mold and for maintenance of the requisite accuracy.

After the polygonal mirror 10 constructed as above has been molded by means of injection molding in a manner as described above, silver or aluminum is plated onto the reflecting faces 12A of the mirror body 12 to bring the reflecting faces 12A respectively to mirror faces. Thus, the polygonal mirror 10 is completed.

With reference to FIGS. 1 through 4, the embodiment has been described as having the mirror body 12 in the form of a regular hexagonal prism having the six reflecting faces 12A. It is to be understood, however, that the mirror body 12 may be in the form of any regular prism such as, for example, an octahedral prism having eight reflecting faces.

It is also needless to say that the plastic raw material of the polygonal mirror 10 can suitably be altered in consideration of strength, moldability and the like.

Figure 5:
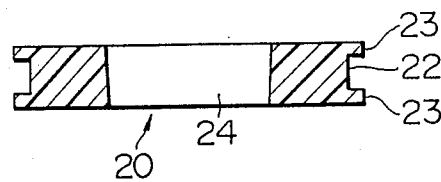
FIG. 5 is a view similar to FIG. 2, but showing a polygonal mirror according to a modification of the invention.

FIG. 5 shows a modification of the polygonal mirror according to the invention. The polygonal mirror according to the modification is generally designated by the reference numeral 20. Like the embodiment described above with reference to FIGS. 1 and 2, the polygonal mirror 20 comprises a mirror body 22 in the form of a regular hexagonal prism. A pair of flanges 23 and 23 are integrally provided on the mirror body 22 respectively in the vicinity of opposite axial ends of the mirror body 22. Each of the flanges 23 and 23 is in the form of a disc having a diameter equal to or larger than that of a circle circumscribing the hexagonal prism of the mirror body 22 in a plane perpendicular to a central axis thereof. A central attaching bore 24 is provided through the mirror body 22 and extends in concentric relation to the central axis thereof, like the attaching bore 14 of the aforesaid embodiment. With the structure of the polygonal mirror 20 shown in FIG. 5, the outer configuration of the polygonal mirror 20 can be made uniform, thereby further improving moldability.

Figure 6:
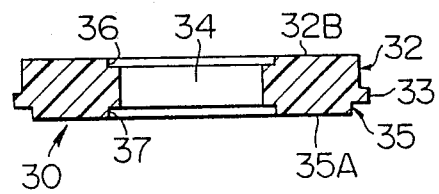
FIG. 6 is a view similar to FIG. 2, but showing a polygonal mirror according to another modification of the invention.

FIG. 6 shows another modification of the polygonal mirror according to the invention. The polygonal mirror is generally designated by the reference numeral 30, and is composed of a mirror body 32 in the form of a regular hexagonal prism and a flange 33 integrally provided on the mirror body 32 in the vicinity of one axial end thereof, like the embodiment illustrated in FIGS. 1 and 2. The flange 33 is in the form of a disc having a diameter equal to or larger than that of a circle circumscribing the hexagonal prism of the mirror body 32 in a plane perpendicular to a central axis thereof. The flange 33 is integrally provided with a circular projection 35 projecting axially from an end face of the flange 33 remote from the mirror body 32. The circular projection 35 has a free end face 35A serving as a reference surface, like the projection 15 of the above-described embodiment. A central attaching bore 34 is provided through the mirror body 32 in concentric relation to the central axis thereof. A pair of recesses 36 and 37 larger in diameter than the central attaching bore 34 are formed respectively in an end face 32B of the mirror body 32 remote from the flange 33 and in the end face 35A of the projection 35 in concentric relation to the central attaching bore 34. In this manner, the end face 35A, which requires a high accuracy to serve as the positioning reference surface at installation of the polygonal mirror 30, is reduced in area. The attaching bore 34, which also requires high accuracy, is reduced in axial length. Thus, it is possible to facilitate manufacture of a mold and to facilitate molding by the mold. In addition, ejector pins can utilize a bottom surface of each of the recesses 36 and 37, for opening the mold.

Figure 7:
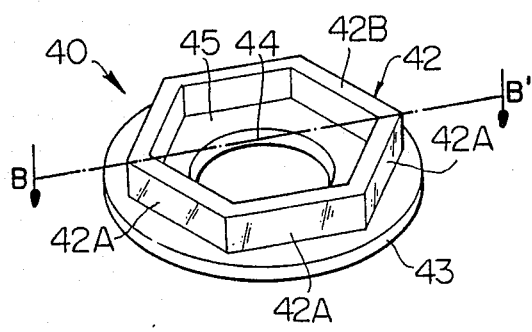
FIG. 7 is a perspective view of a polygonal mirror according to still another modification of the invention.
Figure 8:
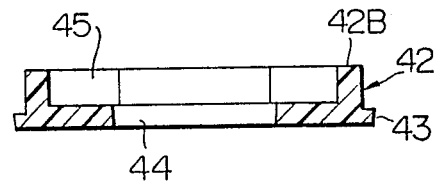
FIG. 8 is a cross-sectional view of the polygonal mirror illustrated in FIG. 7 along line BB'.

FIGS. 7 and 8 show still another modification of the polygonal mirror according to the invention. The polygonal mirror is generally designated by the reference numeral 40, and is composed of a mirror body 42 in the form of a regular hexagonal prism having six reflecting faces 42A and a flange 43 integrally provided on the mirror body 42 in the vicinity of one axial end thereof, like the embodiment illustrated in FIGS. 1 and 2. The flange 43 is in the form of a disc having a diameter equal to or larger than that of a circle circumscribing the hexagonal prism of the mirror body 42 in a plane perpendicular to a central axis thereof. A central attaching bore 44 is formed through the mirror body 42 and extends in concentric relation to the central axis thereof. A recess 45 is formed in an end face 42B of the mirror body 42 remote from the flange 43 and has a central axis in conformity with the central axis of the mirror body 42. The recess 45 has a predetermined depth and a cross-sectional shape similar in figure to the hexagonal prism of the mirror body 42. By the provision of such recess 45, the wall thickness at the reflecting faces 42A and the wall thickness at the end face of the flange 43 can be made uniform with a predetermined value. With such configuration of the polygonal mirror 40 shown in FIGS. 7 and 8, the wall thickness can be made uniform in a substantially perfect manner. Thus, it is possible to almost prevent occurrence of molding defects due to unevenness or nonuniformity of the wall thickness.

As described above, according to the polygonal mirror of the invention, the flange having the size at least equal to the circle circumscribing the regular prism of the mirror body in the plane perpendicular to the central axis thereof is integrally provided on the mirror body in the vicinity of the one axial end thereof. When the polygonal mirror is molded, this flange makes it possible to equalize the distance from the gate or gates to the radial extremity of the polygonal mirror. Thus, moldability can be improved so that molding defects such as sink marks, weld lines and the like can be prevented from occurring, thereby enabling sufficient accuracy to be secured regardless of a slight change in the molding conditions.

Further, the flange can be utilized as a gripping portion. That is, the polygonal mirror can be gripped by utilization of the flange. Thus, handling of the polygonal mirror can be facilitated in a step of applying plating to the polygonal mirror after having been molded and in the subsequent steps, making it possible to reduce man-hours.

In this manner, the polygonal mirror according to the invention can increase the accuracy and can reduce the manufacturing cost.

What is claimed is:

1. A polygonal mirror comprising:
   a mirror body in the form of a regular prism having a central axis, said regular prism having a plurality of side faces formed respectively into reflecting faces wherein, during rotation of said mirror body about said central axis, said reflecting faces successively deflect an incident light ray to cause the deflected light ray to carry out scanning; and
   a flange unitarily formed on said mirror body, said flange having a size at least equal to a circle circumscribing said regular prism in a plane substantially perpendicular to said central axis.

2. The polygonal mirror according to claim 1, wherein said flange is in the form of a disc having a diameter larger than that of said circumscribed circle.

3. The polygonal mirror according to claim 1, wherein said flange has a projection projecting axially from an axial end face of said flange remote from another axial end face of said flange adjacent said mirror body, said projection having a free end face formed into a reference surface.

4. The polygonal mirror according to claim 3, wherein said projection has a circular cross-sectional shape.

5. The polygonal mirror according to claim 1, wherein said reflecting faces extend in parallel relation to said central axis.

6. The polygonal mirror according to claim 1, wherein said reflecting faces are inclined at a predetermined angle with respect to said central axis.

7. The polygonal mirror according to claim 1, wherein said mirror body is provided therethrough with an attaching bore in concentric relation to said central axis, and wherein said mirror body has a pair of recesses formed respectively in opposite end faces of said mirror body in concentric relation to said central axis.

8. The polygonal mirror according to claim 1, wherein said mirror body has a recess formed in an end face of said mirror body remote from said flange, said recess having a cross-sectional shape similar in figure to that of said regular prism.

9. The polygonal mirror according to claim 1, wherein said regular prism is a hexagonal prism.

10. The polygonal mirror according to claim 1, wherein said flange is unitarily formed in the vicinity of an axial end of said mirror body.

11. The polygonal mirror according to claim 10, which further comprises a second flange unitarily formed on said mirror body in the vicinity of another axial end thereof, said second flange having a size at least equal to said circle circumscribing said regular prism.

12. A method of making a polygonal mirror having a mirror body in the form of a regular prism having a central axis, said regular prism having a plurality of side faces formed respectively into reflecting faces wherein, during rotation of said mirror body about said central axis, said reflecting faces successively deflect an incident light ray to cause the deflected light ray to carry out scanning; and a flange unitarily formed on said mirror body, said flange having a size at least equal to a circle circumscribing said regular prism in a plane substantially perpendicular to said central axis, injection molding said polygonal mirror to unitarily form said flange and said mirror body.

13. A method of making a polygonal mirror having a mirror body in the form of a regular prism having a central axis, said regular prism having a plurality of side faces formed respectively into reflecting faces wherein, during rotation of said mirror body about said central axis, said reflecting faces successively deflect an incident light ray to cause the deflected light ray to carry out scanning; and a flange unitarily formed on said mirror body, said flange having a size at least equal to a circle circumscribing said regular prism in a plane substantially perpendicular to said central axis, positioning a sprue in substantial alignment with said central axis and injecting amolten plastic therethrough to unitarily from said flange and said mirror body.

14. A method of making a polygonal mirror having a mirror body in the form of a regular prism having a central axis, said regular prism having a plurality of side faces formed respectively into reflecting faces wherein, during rotation of said mirror body about said central axis, said reflecting faces successively deflect an incident light ray to cause the deflected light ray to carry out scanning; and a flange unitarily formed on said mirror body, said flange having a size at least equal to a circle circumscribing said regular prism in a plane substantially perpendicular to said central axis, positioning a sprue in substantial alignment with said central axis and injecting a molten polycarbonate therethrough to unitarily form said flange and said mirror body.

15. A method of making a polygonal mirror having a mirror body in the form of a regular prism having a central axis, said regular prism having a plurality of side faces formed respectively into reflecting faces wherein, during rotation of said mirror body about said central axis, said reflecting faces successively deflect an incident light ray to cause the deflected light ray to carry out scanning; and a flange unitarily formed on said mirror body, said flange having a size at least equal to a circle circumscribing said regular prism in a plane substantially perpendicular to said central axis, positioning a sprue in substantial alignment with said central axis and injecting a molten plastic therethrough into a mold cavity through a plurality of radial gates to unitarily form said flange and said mirror body.

16. A method of making a polygonal mirror having a mirror body in the form of a regular prism having a central axis, said regular prism having a plurality of side faces formed respectively into reflecting faces wherein, during rotation of said mirror body about said central axis, said reflecting faces successively deflect an incident light ray to cause the deflected light ray to carry out scanning; and a flange unitarily formed on said mirror body, said flange having a size at least equal to a circle circumscribing said regular prism in a plane substantially perpendicular to said central axis, positioning a sprue in substantial alignment with said central axis and injecting a molten plastic therethrough into a mold cavity through a disc gate to unitarily form said flange and said mirror body.

17. A method of making a polygonal mirror having a mirror body in the form of a regular prism having a central axis, said regular prism having a plurality of side faces formed respectively into reflecting faces wherein, during rotation of said mirror body about said central axis, said reflecting faces successively deflect an incident light ray to cause the deflected light ray to carry out scanning; and a flange unitarily formed on said mirror body, said flange having a size at least equal to a circle circumscribing said regular prism in a plane substantially perpendicular to said central axis, positioning a sprue in substantial alignment with said central axis and injecting a molten plastic therethrough into a mold cavity through a gate or gates to unitarily form said flange and said mirror body such that the distance from said gate or gates to the extremity of said flange is substantially equalized and such that said molten plastic is injected to a substantially uniform level within said mold cavity.

* * * * *

UNITED STATES PATENT AND TRADEMARK OFFICE
CERTIFICATE OF CORRECTION

PATENT NO. : 4,884,856

DATED : December 5, 1989

INVENTOR(S) : H. Takeyasu, et al

It is certified that error appears in the above-identified patent and that said Letters Patent is hereby corrected as shown below:

```
Abstract, line 6, change "indicent" to ---incident---;
column 2, line 4, change "man-hour" to ---man-hours---;
column 2, line 35, change "FIg" to ---FIG---;
column 3, line 7, change "axial one" to ---one axial--- column 3, line 11, insert ---of--- after "diameter";
column 3, line 28, insert ---.--- after "accuracy";
column 3, line 43, change "locations" to ---location--- column 7, line 24, insert ---comprising:--- after "axis,";
column 7, line 37, insert ---comprising:--- after "axis,";
column 7, line 39, change "amolten" to ---a molten---;
column 7, line 40, change "from" to ---form---;
column 7, line 51, insert ---comprising:--- after "axis,";

column 8, line 13, insert ---comprising:--- after "axis,";
column 8, line 28, insert ---comprising:--- after "axis,";

column 8, line 43, inset ---comprising:--- after "axis,".
```

Signed and Sealed this

Second Day of July, 1991

*Attest:*

HARRY F. MANBECK, JR.

*Attesting Officer*     *Commissioner of Patents and Trademarks*